United States Patent [19]

Schwarzschild

[11] Patent Number: 5,020,744
[45] Date of Patent: Jun. 4, 1991

[54] METHOD FOR ACQUIRING THREE-AXIS EARTH POINTING ATTITUDE FOR AN INITIALLY SPINNING SPACECRAFT

[75] Inventor: Marc Schwarzschild, East Brunswick, N.J.

[73] Assignee: General Electric Company, East Windsor, N.J.

[21] Appl. No.: 465,817

[22] Filed: Jan. 12, 1990

[51] Int. Cl.$^5$ ............................................. B64G 1/24
[52] U.S. Cl. .................................................. 244/164
[58] Field of Search ............... 244/158, 164, 168, 171; 364/434, 459

[56] References Cited

U.S. PATENT DOCUMENTS

| | | | |
|---|---|---|---|
| 3,222,675 | 12/1965 | Schwartz | 244/158 |
| 3,996,804 | 12/1976 | Neufeld | 244/168 |
| 4,071,211 | 1/1978 | Muhlfelder | 244/171 |
| 4,161,780 | 7/1979 | Rudolph et al. | 364/434 |
| 4,617,634 | 10/1986 | Izumida et al. | 364/434 |
| 4,725,024 | 2/1988 | Vorlicek | 244/165 |
| 4,827,422 | 5/1989 | Savoca | 364/434 |
| 4,884,771 | 12/1989 | Scheit et al. | |

OTHER PUBLICATIONS

"An Attitude Acquisition System for Communication Spacecraft Using Spinning Initialization of Inertial Parameters SIIP", by M. Schwarzschild, Aug. 14, 1989, AIAA Guidance, Navigating and Control Conference, Boston, Mass.

Search of prior art using NERAC in four parts, each of which is a list of titles with abstracts.

"A Fast Attitude Recovery System for Communications Satellites: Experience of Eutelsat 5", by Van Holtz et al., published in relation to the 12th Annual AAS Guidance and Control Conference, Feb. 4–8, 1989.

*Primary Examiner*—Joseph F. Peters, Jr.
*Assistant Examiner*—Virna Lissi Mojica
*Attorney, Agent, or Firm*—William H. Meise

[57] ABSTRACT

A method for making a transition between a spin-stabilized spacecraft operating mode and a 3-axis stabilized mode includes the step of determining the orientation of the spin axis. A reference object detector such as a sun sensor produces a pulse as it crosses the reference, thereby completely specifying the attitude of the spinning spacecraft at that instant. Angular rate information is used to update the attitude information while a feedback system controls torques for slowing the spin and for assuming the desired attitude.

17 Claims, 12 Drawing Sheets

$$\begin{cases} \text{SPACECRAFT INERTIA} \quad I = \begin{bmatrix} 1458 & 0 & 0 \\ 0 & 1706 & -98 \\ 0 & -98 & 1824 \end{bmatrix} (Kg \cdot m^2) \\ \\ \text{WHEEL INERTIA} = 0.175 \, Kg \cdot m^2 \\ \\ \text{RATE DAMPING GAINS (N} \cdot m \cdot SEC \, / \, RAD) = [\,129.2, \, 151.1, \, 161.6\,] \\ \\ \text{BODY RATE THRESHOLD} \quad 1.7 \text{ DEGREES / SEC.} \\ \\ \text{CONTROL INTERVAL} \quad 0.2 \text{ SEC.} \\ \\ \text{GYRO SAMPLING INTERVAL} \quad 0.1 \text{ SEC.} \\ \\ \text{INITIAL SPIN RATE} \quad 5.0 \text{ RPM} \end{cases}$$

| TIME AFTER SUN PULSE (mm:ss) | EVENT |
|---|---|
| -40:00 | POWER UP GYROS |
| -30:00 | COMMAND INITIAL QUATERNION BASED ON ATTITUDE DETERMINATION |
| -10:00 | GYRO WARM-UP COMPLETE |
| 0:00 | START PROPAGATING QUATERNIONS; START FEEDBACK CONTROL |
| 1:30 | SPACECRAFT DESPUN AND ACQUISITION BEGINS |
| 4:00 | ACQUISITION COMPLETE AND WHEEL SPINUP COMMANDED |
| 30:00 | MANEUVER COMPLETED |

METHOD FOR ACQUIRING THREE-AXIS EARTH POINTING ATTITUDE FOR AN INITIALLY SPINNING SPACECRAFT

BACKGROUND OF THE INVENTION

This invention relates to attitude control of spacecraft, and more particularly to a method for transfer from a spin-stabilized to a three-axis stabilized operating mode.

Artificial satellites are in widespread use for various purposes. For some purposes, as for example for communication purposes, a satellite may be required to direct an instrument such as an antenna toward a heavenly body, hereinafter referred to as "Earth".

The launching of an artificial satellite may be accomplished by a vehicle, such as a space shuttle, which places the satellite in a low Earth orbit. A satellite on a shuttle takes a path illustrated as 31 in FIG. 2. Path 31 extends from Earth 30 to a low Earth orbit 32, where the satellite is released. The satellite is often spin-stabilized when released from the shuttle, with a typical rotational speed of 10 rpm.

Figure 2:
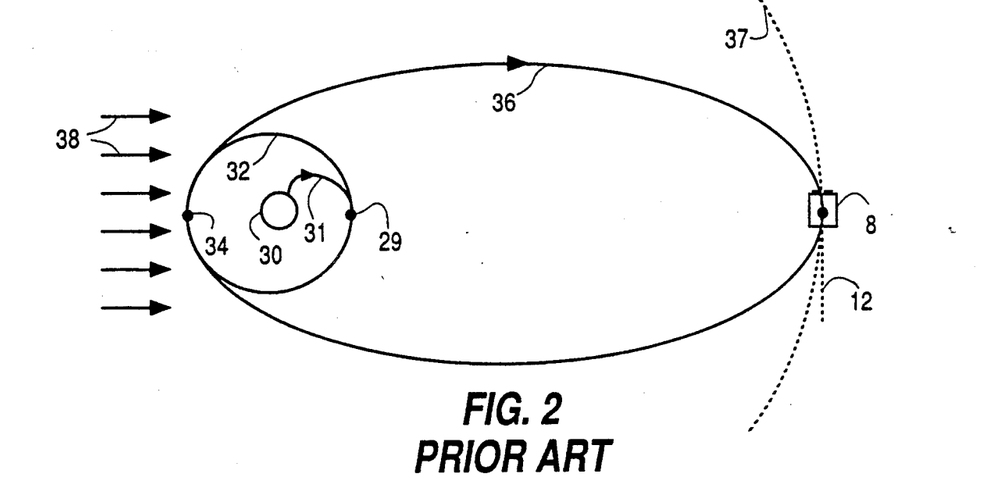
FIG. 2 illustrates in plan view the orbital plane and trajectories associated with launching a spacecraft.

A perigee thruster or engine is operated at a point 34 of FIG. 2 to boost the satellite from low Earth orbit 32 into an elliptical transfer orbit illustrated as 36 in FIG. 2. The perigee of transfer orbit 36 is at the altitude of the low Earth orbit, and the apogee is at the desired final orbital altitude. For a geosynchronous satellite, the final orbital altitude is approximately 22,400 miles. The apogee location in FIG. 2 is occupied by spacecraft 8.

Figure 1A:
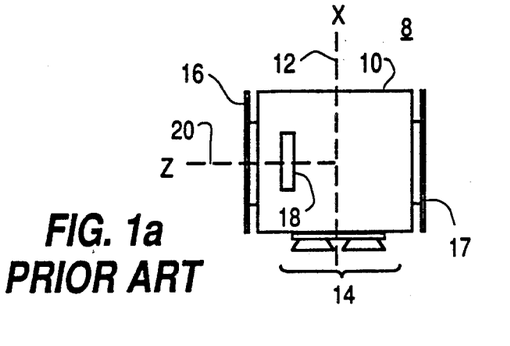
FIGS. 1a, 1b, and 1c, referred to jointly as FIG. 1, illustrate a spacecraft and relative attitudes during a prior-art maneuver.

When the satellite arrives at the apogee of the transfer orbit, it is still spinning. The spin axis is often designed to be coincident with the thrust or ΔV axis of the apogee kick thruster or engine. FIG. 1a illustrates a typical satellite 8 configuration, including a satellite body 10 spinning about an X axis 12, upon which an apogee kick thruster assembly 14 is centered. Stowed or undeployed solar panels illustrated as 16 and 17 face outward from the body of spacecraft 10, in a direction orthogonal to spin axis 12.

If the satellite is launched by an unmanned rocket rather than by the space shuttle, it may enter the transfer orbit directly, without an intermediary lower orbit. In either case, the satellite arrives at the apogee spinning about its X axis 12. Ideally, the satellite spin axis should be oriented so that the apogee kick thruster produces velocity to place the spacecraft in the orbital plane (the plane of FIG. 2), and to adjust the orbit size. When launch is from a space shuttle, the spin axis will be in the equatorial plane, whereas the unmanned rocket may often leave the spin axis inclined relative to the equatorial plane. If the spin axis is not in the equatorial plane, it is rotated into the equatorial plane, and the apogee kick thrusters are then fired in order to achieve the final circular orbit, 37 of FIG. 2.

When the circular orbit is achieved, the satellite is still spinning about its axis 12. Since the satellite is spinning, the solar panels cannot be deployed, and satellite maneuvers including attitude stabilization and general maintenance (operation) must be accomplished using battery power if the solar panels do not receive sunlight.

So long as X axis 12, the satellite spin axis, remains in the equatorial plane, the spin of satellite 8 allows sunlight to fall on solar panels 16 and 17 during its rotation and operating power can be maintained. The sun lies in the plane of the ecliptic, which is inclined (as much as 23°) relative to the equatorial plane. Sunlight is always available in the equatorial plane, as illustrated by arrows 38 of FIG. 2, except at locations which are eclipsed by the Earth. The direction from which sunlight arrives depends upon the time of year. The eclipse is very short, and therefore the spinning satellite can remain active in the final orbit indefinitely. However, in order to be useful, certain satellites must be de-spun and must assume particular attitudes relative to the Earth. Two despinning and reorienting modes are in general use.

A first despinning and attitude stabilization system utilizes thrusters to almost completely despin the satellite about the X axis 12. An active three-axis control system must be engaged essentially immediately in order to avoid destabilization. The spacecraft is immediately re-spun to a low rate, such as 1/10 rpm, about an axis which is perpendicular to the boresight of a two-axis sun sensor. The two-axis sun sensor then scans across the sky under the influence of the spin. The sun sensor produces two-axis information defining the angle of the sun relative to the boresight. Once the sun has been acquired by the two-axis sun sensor, thrusters are used in a feedback manner to despin relative to the sun, so that the sun is on the boresight of the sun sensor. Additional thrusters are then used to spin up about the sun line to 1/10 rpm. An Earth sensor, oriented with its boresight perpendicular to the boresight of the sun sensor, then scans across the sky, looking for the Earth. However, the Earth can be acquired by the Earth sensor only twice per orbit, at 6 AM and 6 PM local time, at which time the sun and the Earth are at right angles to each other relative to the spacecraft. Once Earth and sun have been acquired, the satellite is de-spun relative to the Earth. The satellite has essentially no spin stabilization at this time. The momentum wheels are energized or spun up in order to transition from zero momentum to bias momentum control, and the solar arrays are deployed. This method has the advantage that it can be used with any spacecraft and it may be autonomous, but is disadvantageous in that the pointing accuracy depends upon the accuracy of the sun sensor, so high pointing accuracy requires an expensive high-accuracy two-axis sun sensor. Also, the spin-up of the momentum wheels and the deploying of the solar arrays must be accomplished quickly, because after the final despinning step, the lock of the sun sensor on the sun begins to be lost.

A second method for despinning the satellite and entering three-axis attitude control is the dual-spin turn. In the dual-spin turn, the spacecraft is first rotated by applying thruster torque so that x spin axis 12 is aligned with orbit normal (out of the page in FIG. 2). The spacecraft is equipped with a reaction wheel or momentum wheel illustrated in FIG. 1 as 18, with its spin axis 20 orthogonal to spin axis 12.

Figure 1B:
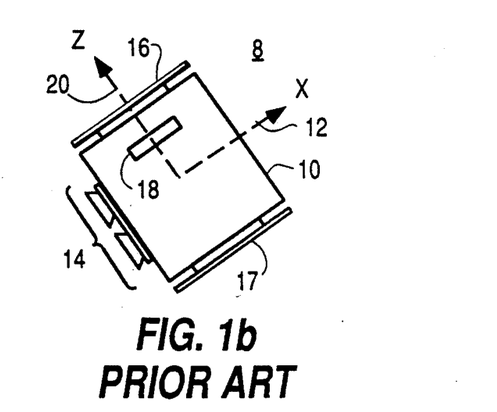
Figure 1C:
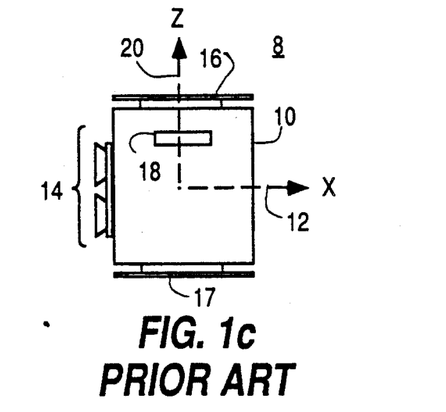

Wheel 18 is initially not spinning when the satellite enters its final orbit, such as the geosynchronous orbit illustrated as 37 of FIG. 2. The final attitude desired for the spacecraft is with the X axis directed toward the Earth, and with Z axis 20 aligned with the orbit normal. The dual spin turn maneuver is continued by applying a torque to spacecraft body 10 by accelerating reaction wheel or momentum wheel 18 of FIG. 1a. Acceleration of the wheel produces a torque about axis 20 tending to rotate body 10 of spacecraft 8, which rotation is resisted by the gyroscopic stiffness provided by the spacecraft spin about axis 12. This combination of forces results in a motion which directs the Z axis 20 out of the orbital plane, and which also rotates the X axis as illustrated in FIG. 1b, positioning it in the orbit plane, and leaving it spinning at a low rate. Since the momentum remains fixed, the spin of the spacecraft body is reduced as wheel 18 is accelerated. In order to maintain stability of the maneuver, some residual body spin must remain, and therefore the Z axis does not quite reach coincidence with orbit normal. In addition, the residual spin results in nutation of the spacecraft body.

By reference to FIG. 1b, with the Z axis substantially aligned with orbit normal, it can be seen that solar panels 16 and 17 receive no sunlight in any orientation, and therefore the satellite must operate using battery power until the completion of the maneuver including the deploying of solar panels 16 and 17. The batteries are designed to operate the satellite under full load (with all transponders operating) during eclipse, which is a relatively short period (less than an hour) during each orbit. Batteries are therefore capable of operating the satellite under light-load conditions for periods which typically range from two to ten hours. Thus, a race against time begins in the dual-spin turn maneuver, following the rotation of the Z axis into coincidence with orbit normal. This race requires that the nutation due to residual spin be damped, and the spacecraft despun. All motion of the spacecraft must cease before deployment of the solar panels before the batteries are depleted.

Damping of the nutation and despinning results in the desired final attitude. The damping may be provided by either passive or active means. For reliability purposes, passive damping is preferred. The passive damping is often provided by the sloshing of fuel in the fuel tanks of the spacecraft. The nutation damping time constant depends on mass properties and spacecraft geometry. Too long a time constant compared with electrical storage capacity may render the maneuver impossible.

An improved transition maneuver is desired.

SUMMARY OF THE INVENTION

A spacecraft includes an arrangement for providing 3-axis angular rate information, a reference object sensor such as a sun sensor, an Earth sensor and a torquer. The spacecraft orbits a heavenly body such as the Earth. A method for acquiring 3-axis Earth pointing attitude for the spacecraft when it is initially spinning includes the step of generating 3-axis angular rate information from the arrangement. The attitude of the spin axis relative to the reference object or sun of the spacecraft is determined, by any of a number of methods, to produce axis orientation information. A sun pulse is generated from the sun sensor at an instant during the spin cycle to produce additional orientation information which, together with the axis orientation information, completely determines the 3-axis attitude of the spacecraft at that instant. Further according to the method, at the moment at which the sun pulse occurs, calculation of the instantaneous attitude of the spacecraft is begun by updating the 3-axis attitude orientation information with the angular rate information. A feedback loop is closed which includes the torquing arrangement. The feedback loop is fed with the results of calculations of current attitude for thereby tending to reduce the spin of the spacecraft and for orienting the spacecraft in a particular attitude relative to the Earth. In an embodiment of the invention, a momentum or reaction wheel is energized to maintain the particular attitude about at least one axis. In another embodiment of the invention, the 3-axis rate information is provided by gyroscopes, and the axis of the wheel is aligned with orbit normal.

DESCRIPTION OF THE INVENTION

Figure 3:
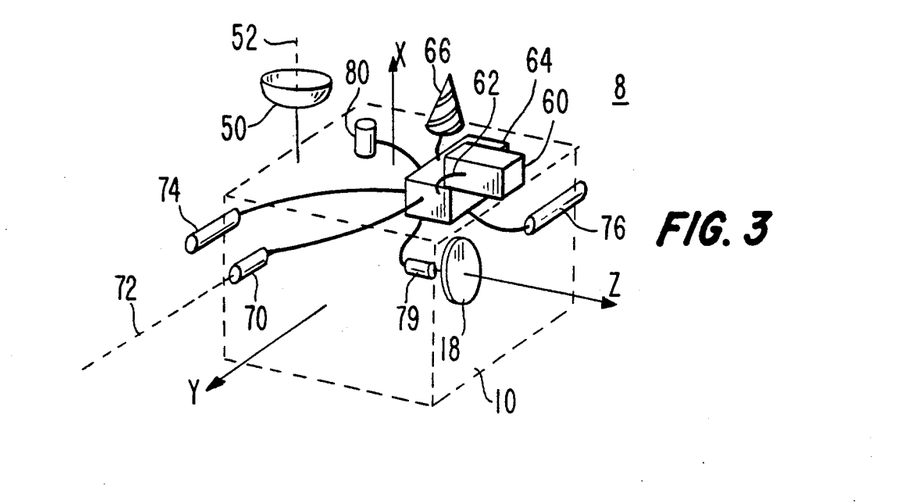
FIG. 3 illustrates a spacecraft which may use the method according to the invention.

FIG. 3 illustrates a spacecraft 8 according to the invention. Spacecraft 8 includes a body 10 illustrated as a cube with faces oriented in the X, Y, and Z directions. Spacecraft 8 bears a payload including a directional antenna 50 which points along an axis 52 aligned or parallel with the X axis. Antenna 50 is ultimately to be directed toward a target such as a location on Earth. Spacecraft 8 also includes a reaction or momentum wheel 18 whose axis is aligned with the Z axis, and which is driven by a motor illustrated as 79. In addition, spacecraft 8 includes a set of gyroscopes illustrated as a block 60 for generating 3-axis angular rate information, which is applied over a bus 62 to a control arrangement illustrated as a block 64. An omnidirectional antenna illustrated as a conical spiral 66 is coupled to control block 64 for transmitting information to, and for receiving instructions from a ground station (not illustrated). A sun sensing arrangement illustrated as 70 has a boresight 72 aligned with the Y axis, and is connected to control block 64 for supplying sun pulses thereto, as described below. An Earth sensor illustrated as 80 is aligned with the X axis, and is connected to control block 64. Control block 64 is also connected to thrusters, two of which are illustrated as 74 and 76. Control block 64 controls the firing of the thrusters to provide thrusts and torques for maneuvers according to the method of the invention.

Figure 4A:
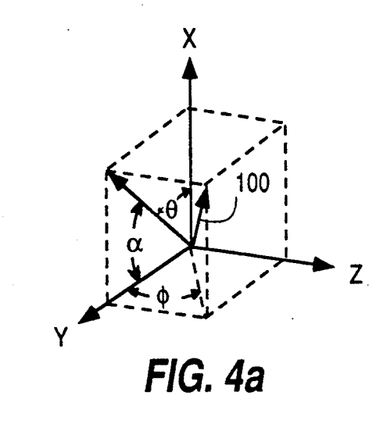
FIGS. 4a, 4b, and 4c, referred to jointly as FIG. 4, illustrate a coordinate system associated with a sun sensor, plots of beamwidth in two orthogonal planes of a sun sensor, and a block diagram illustrating generation of a pulse from a sun sensor, respectively.

FIG. 4a illustrates x, y, and z mutually orthogonal axes. Angles $\alpha$ and $\phi$ are measured relative to the y axis, with $\phi$ conventionally called an azimuth angle, which ranges from 0° to 359°, and $\alpha$ conventionally called elevation angle, which ranges from 0° to ±90° angle $\theta$ is a zenith angle. Any arbitrary vector, such as vector 100, can have its direction specified in terms of azimuth angle $\phi$ and elevation angle $\alpha$.

Figure 4B:
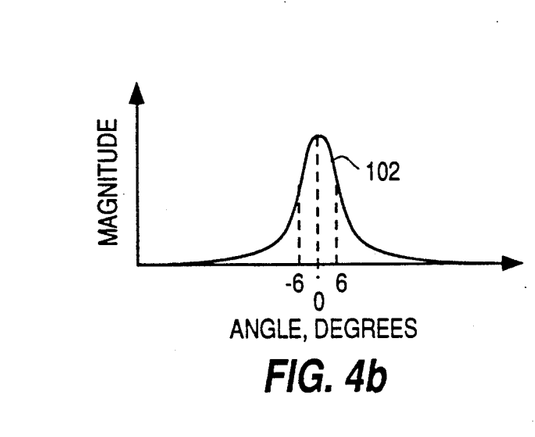

FIG. 4b illustrates as a plot 102 the relative response of sun sensor 70 of FIG. 3 as a function of azimuth angle $\phi$. It can be seen that the relative response in the azimuth plane is relatively sharp or narrow. Plot 12 also represents the response as a function of elevation angle $\alpha$ of a sun sensor element 470 included in sensor 70 of FIG. 3. The response of sun sensor 470 as described in conjunction with FIG. 4b defines what, in antenna terms, might be denominated a "spot" beam. Such a beam, when scanned across the sky in response to rotation of spacecraft 8 of FIG. 3 about the X axis, has a likelihood of intercepting and responding to the sun which depends upon the included angle of the beam. When the beam of sun sensor 70 of FIG. 3 scans across the sun, it produces a sharp rise and fall (a pulse) of signal having an amplitude-time waveform similar to solid-line plot 102 of FIG. 4b. Sun sensor 470 may be calibrated so that it produces information indicative of the angle of the sun as described below, but this is not necessary to the invention.

Figure 4C:
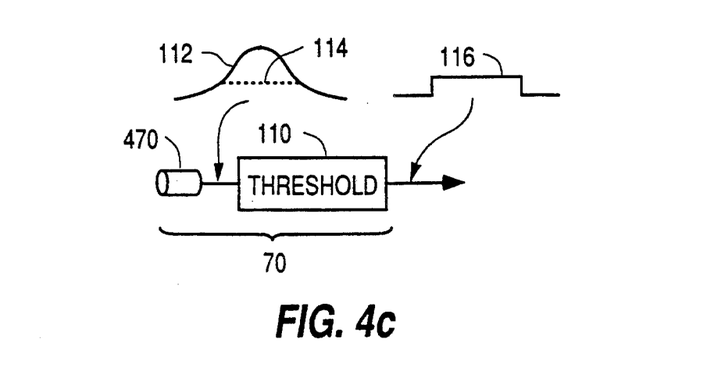

FIG. 4c is a block diagram illustrating sun sensor 470 coupled to a threshold circuit illustrated as a block 110. The signal produced by sun sensor 470 as it sweeps across the sky and intercepts the sun is illustrated as 112. Threshold circuit 110 may include a circuit similar to a comparator, which makes a transition at a threshold magnitude, such as signal level 114 of FIG. 4c, to produce a pulse illustrated as 116. Referring once again to FIG. 3, pulse 116 is coupled from sun sensing arrangement 70 to control 64.

Figure 5:
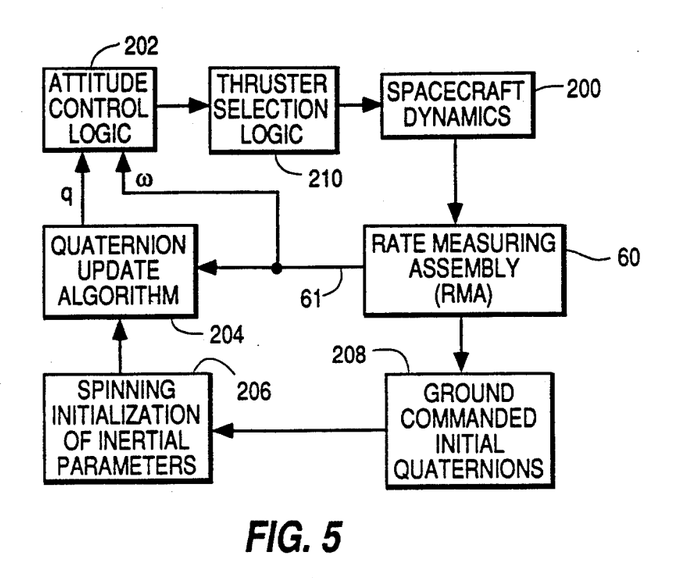
FIG. 5 is a block diagram of a control arrangement for effecting a satellite maneuver in accordance with the invention.

FIG. 5 is a functional block diagram of control arrangements included in the spacecraft of FIG. 3, useful in accomplishing the method in accordance with the invention. In FIG. 5, the spacecraft body and its dynamics are illustrated as a block 200. A rate measuring assembly such as gyroscope arrangement 60 is coupled to the spacecraft, and therefore responds to spacecraft dynamics block 200 of FIG. 5. The measured angular rates of the spacecraft, denominated $\omega$, are applied over a bus 61 to an attitude control logic circuit illustrated as a block 202, and are also applied to a calculating arrangement, illustrated by block 204, for quaternion update, to calculate the moment-to-moment attitude. The quaternion update algorithm is initialized with initial parameters, as illustrated by a block 206, based upon an initial determination of the spin axis attitude, as established by a ground station (not illustrated). The command by the ground station to load initial quaternions is illustrated by block 208. The establishing of the attitude of the spacecraft may be accomplished from the ground in the manner described by Clark Cohen in copending U.S. patent application Ser. No. 07/397,939, filed Aug. 24, 1989. Alternatively, Earth sensor 80 of FIG. 3 may be of the chord width measuring type, and sun angle data established by sun sensor assembly 70 may, together with Earth chord width information from Earth sensor 80, be telemetered to Earth for a determination of the spacecraft spin axis attitude in known fashion. However determined, the initial spin axis attitude is used to generate initial quaternions.

The initial quaternions are applied to attitude control logic block 202 as an indication of the current attitude of the spacecraft spin axis. Calculations, which began at the time of the sun pulse, determines the current attitude. The current attitude of the spacecraft is compared with the desired attitude to produce torque command signals, which are applied to thruster selection logic illustrated as a block 210. A thruster selection logic selects the thrusters to supply the desired direction of torque, and may also pulse-width modulate the torquers for modulating their output to obtain a desired thrust magnitude. The thruster torque represented by block 210 acts on a spacecraft and its dynamics illustrated by block 200.

Figure 6:
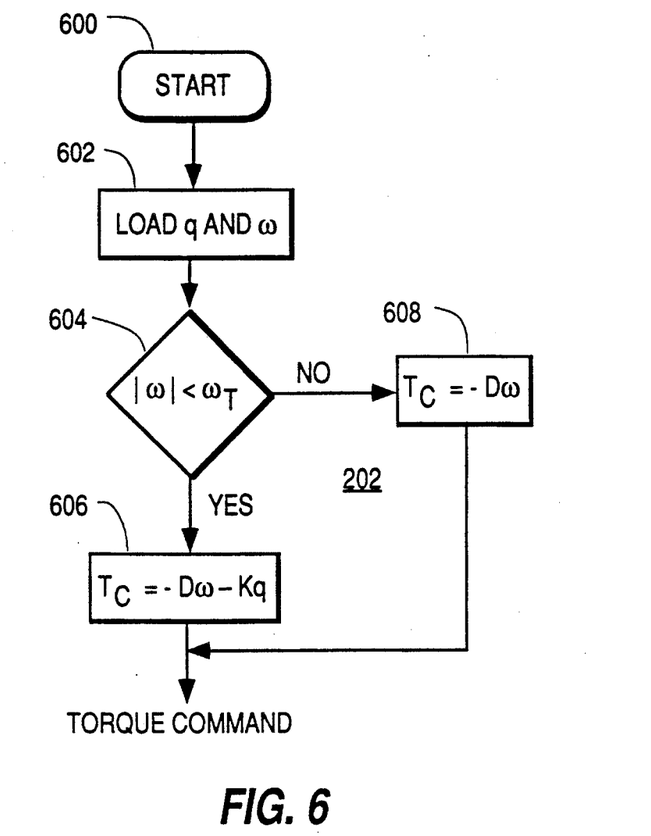
FIG. 6 illustrates an attitude control system which may be useful in the control system of FIG. 5.

FIG. 6 illustrates the operation of attitude control logic 202 of FIG. 5 in flow-chart form. In FIG. 6, the torque command is recurrently computed by recurrent passes through the flow-chart. The flow-chart starts at a start block 600, and proceeds to a block 602 representing the loading of the current values of angular rate $\omega$ and quaternion q. The logic enters a decision block 604 which compares the absolute value of $\omega$ (the length of the $\omega$ vector) with a threshold magnitude $\omega_T$. If the absolute value of vector $\omega$ is less than the threshold value, the logic flows from decision block 604 by the YES output to a further block 606. In block 606, the torque command is calculated by multiplying a matrix D by $\omega$, and summing it with the product of matrix K multiplied by q. If the result of the comparison in decision block 604 is such that vector $\omega$ is larger than the reference value, the logic flows from block 604 by the NO path and reaches a block 608, representing the calculation of the torque command by multiplication of matrix D by $\omega$.

The form of the K matrix is $$K = \begin{bmatrix} 0 & k_1 & 0 & 0 \\ 0 & 0 & k_2 & 0 \\ 0 & 0 & 0 & k_3 \end{bmatrix} \quad (1)$$

where the k's are quaternion gains.

The form of the D matrix is $$D = \begin{bmatrix} d_1 & 0 & 0 \\ 0 & d_2 & 0 \\ 0 & 0 & d_3 \end{bmatrix} \quad (2)$$

where the d's are rate damping gains.

Figure 7:
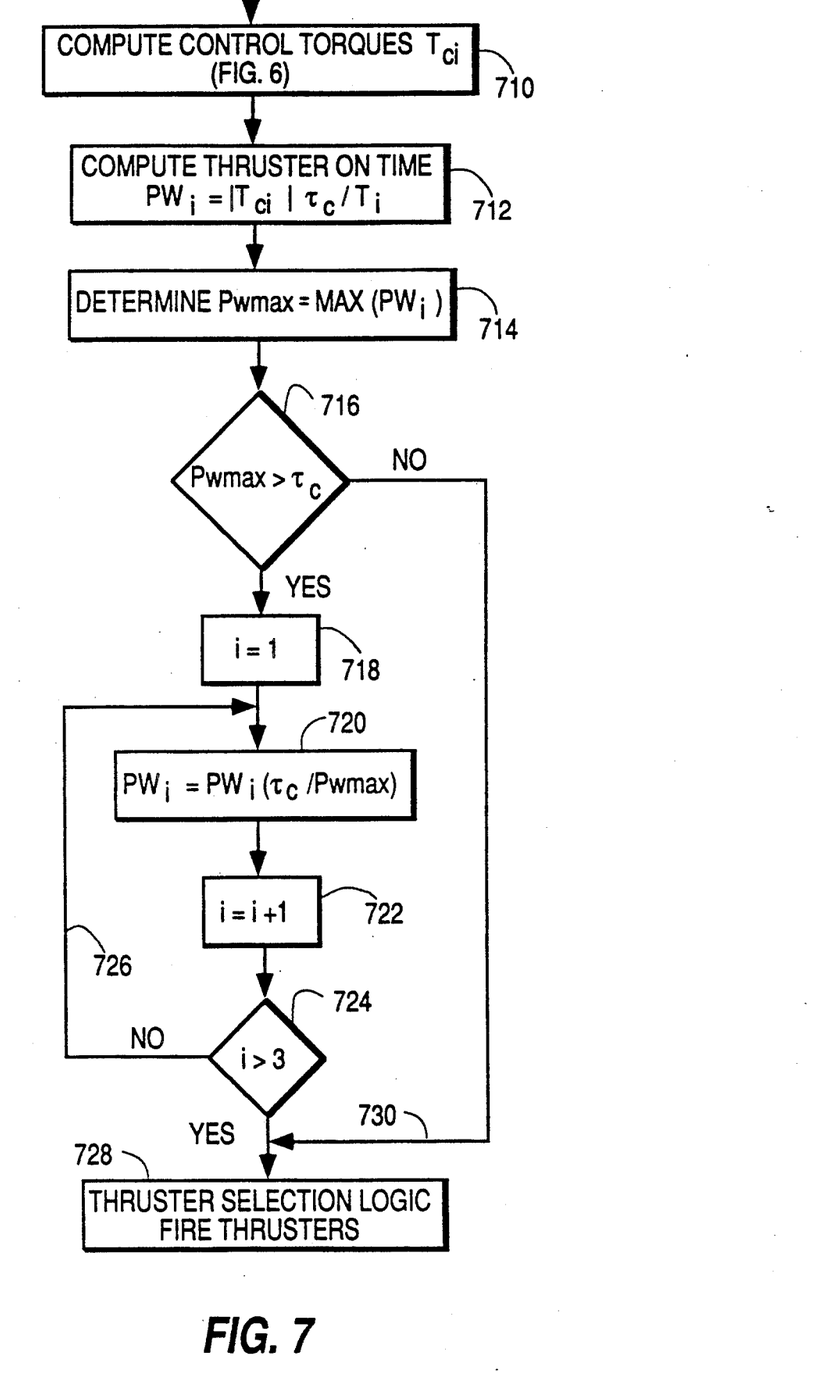
FIG. 7 is a flow chart illustrating pulse-width control of thrusters which may be useful in the control arrangement of FIG. 5.

FIG. 7 is a flow-chart illustrating the operation of the thruster selection logic 210 of FIG. 5. In FIG. 7, block 710 represents the computation of the control torques in accordance with the method described in FIG. 6. The control torques are applied to a block 712, for computation of the ON time of the thrusters.

$$PW = |T_c|\tau/T_i \quad (3)$$

where
PW = pulse duration;
$T_c$ is the desired torque for a particular axis for a duration of $\tau$;

$\tau$ is the period of time covered by the sample; and
$T_i$ is the available torque provided the $i^{th}$ axis of the three possible axes of the coordinate system of FIG. 3.

From block 712, the logic flows to a block 714, which represents determination of the maximum pulse width Pwmax, which is simply the largest of the three $PW_i$ which were calculated in block 712.

The logic flows from block 714 of FIG. 7 to a decision block 17. Decision block 17 compares the Pwmax with $\tau_c$, where $\tau_c$ is the sampling time. If the calculated pulse width Pwmax is greater than sample time, further processing must be performed. If the time duration of the pulse width is less the sampling period, the logic proceeds by the NO output of decision block 716, and by way of a logic path 730, directly to a block 728, which represents selection of the desired thrusters and the firing of the thrusters for the desired pulse.

If the maximum pulse duration Pwmax is greater than $\tau_c$, the logic exits from decision block 716 by way of the YES output to a further block 718, which initializes parameter i to a value of unity. The value of i ranges from 1 to 3, and represents the axis currently being evaluated. The next step, represented by block 720, scales the thruster period along one of the three axes so that the duration is less than $\tau_c$.

$$PW_i = PW_i (\tau_c / PW_{max}) \qquad (4)$$

In short, the calculated $PW_i$ is the previously calculated value multiplied by the scale factor represented by the parenthetical expression. Index i is incremented in block 722, and decision block 724 compares index i with the number three, to determine whether all three axes have been scaled. So long as all three axes have not been scaled, the logic exits from decision block 724 by the NO output, and returns to block 720 by way of logic path 726. When all three pulse widths have been scaled, the logic flows from decision block 724 by the YES output, proceeding to block 728, representing the firing of the thrusters.

Figure 8:
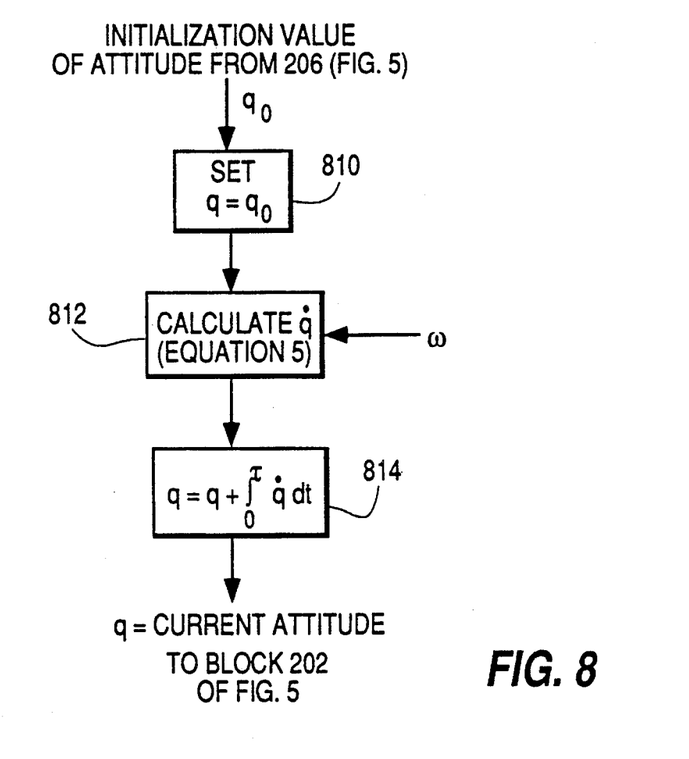
FIG. 8 is a flow chart representing the calculation of attitude.

FIG. 8 is a flow chart representing the operation of block 204 of FIG. 5. In FIG. 8, block 810 receives $q_0$, the initial quaternion, from block 206 of FIG. 5. Block 810 sets q equal $q_0$, and applies q to a block 812. Block 812 represents the calculation of q· by updating q continuously with q̇, which is received from block 60 of FIG. 5.

$$\dot{q} = \frac{1}{2} \begin{bmatrix} 0 & -W_1 & -W_2 & -W_3 \\ W_1 & 0 & W_3 & -W_2 \\ W_2 & -W_3 & 0 & W_1 \\ W_3 & W_2 & -W_1 & 0 \end{bmatrix} q \qquad (5)$$

where q is a quaternion or four-element vector, and $\Omega_1$, $\Omega_2$ and $\Omega_3$ are the angular rates in the three axes.

From block 812, the logic flows to a block 814, which sets the current value of q equal to the sum of the previous value of q and an integral $$q = q + \int_0^\tau \dot{q} dt \qquad (6)$$

where $\tau$ is the sampling period for the update, which may or may not be equal to the $\tau$ used in conjunction with equation (3).

Figure 9:
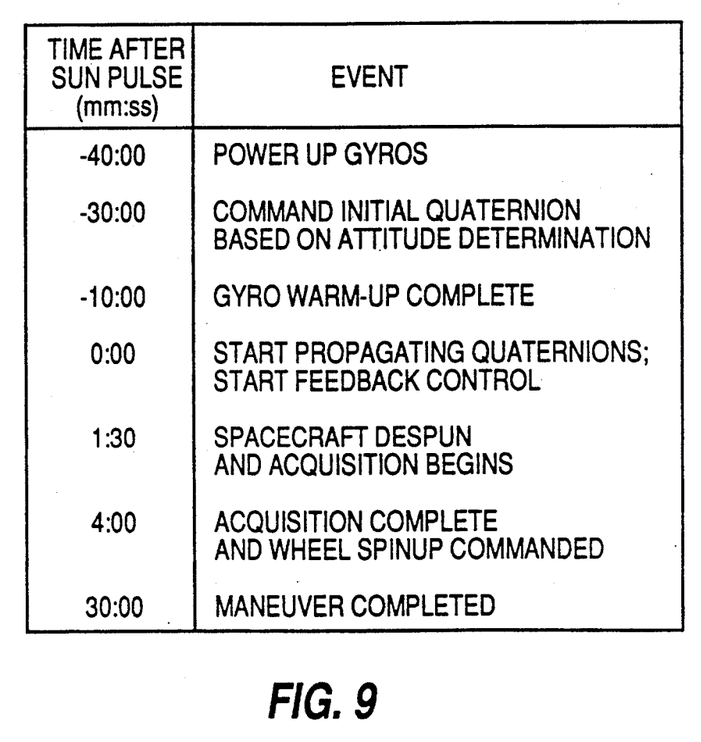
FIG. 9 tabulates and times the sequence of events during a typical maneuver according to the invention.

FIG. 9 describes events and the times at which the events occur in a particular scenario. In FIG. 9, power is applied to the gyros 40 minutes before a time at which the sun pulse is expected to arrive. A few minutes later, the initial quaternion q is transmitted to the spacecraft from the ground station, based upon attitude determinations in progress up to that time. At $-10$ minutes, the gyroscopes are warmed up. Time 0:00 represents the time of the sun pulse, at which time the attitude determination is begun and feedback control is initiated. About one minute and 30 seconds later, the spacecraft has been despun and Earth acquisition begins. At four minutes, Earth acquisition has been completed, and wheel spin-up is commanded. At 30 minutes, the wheel spin-up has been completed, and the maneuver is completed.

As an alternative to the final spin-up of a momentum storage means for stabilization of the spacecraft, an active control system using thrusters might be used.

FIG. 10 represents the results of the simulation of a maneuver in accordance with the invention. The simulations of FIGS. 10 and 11 were performed using the parameters listed in FIG. 13.

Figure 10A:
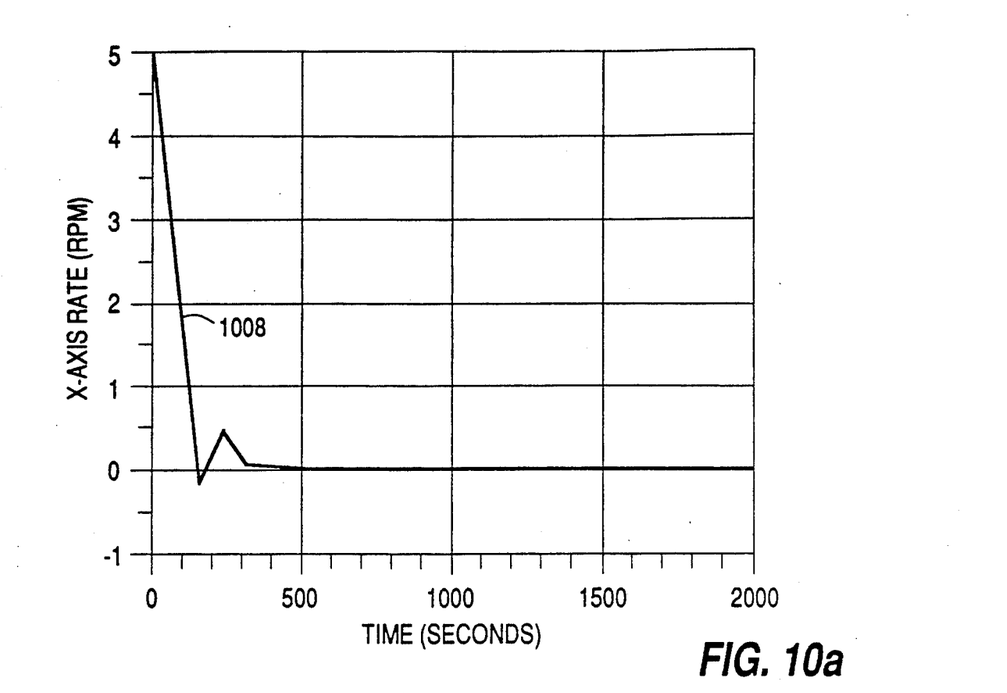
FIGS. 10a, 10b, 10c, and 10d, referred to jointly at FIG. 10, illustrate spin rate, quaternion value, Euler angles, and wheel speed, respectively, versus time, during a simulated maneuver according to the invention under a first set of conditions.
Figure 10B:
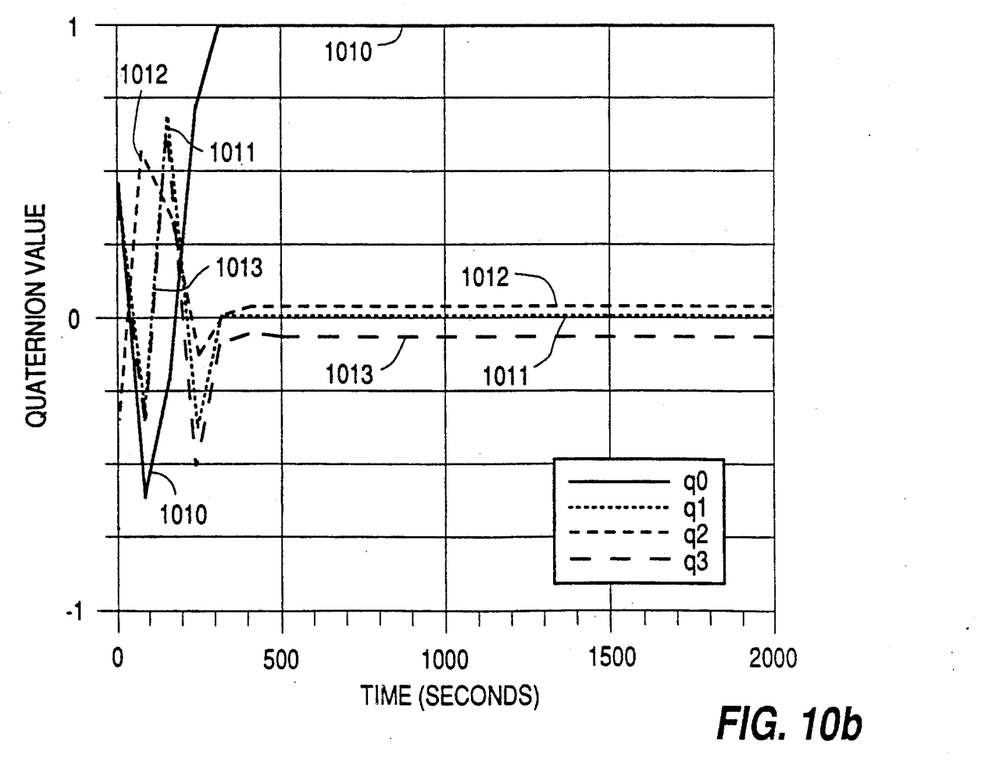
Figure 10C:
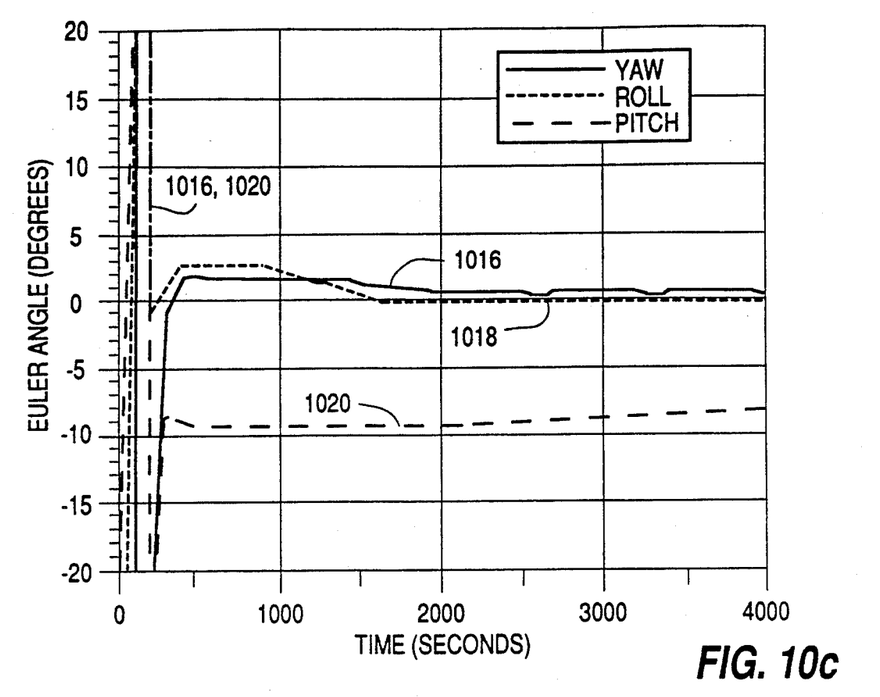
Figure 10D:
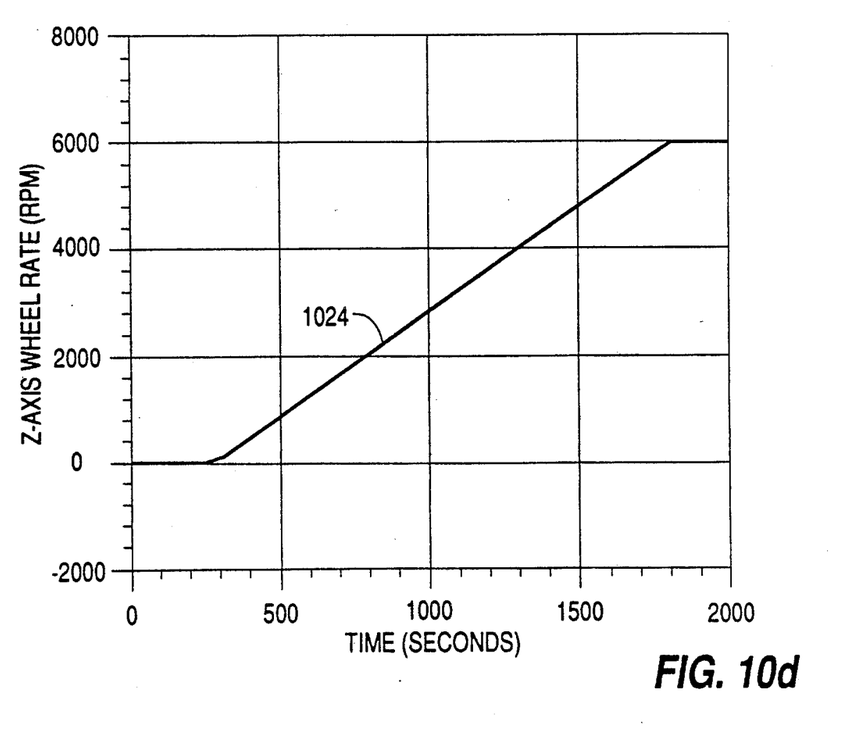
Figure 11A:
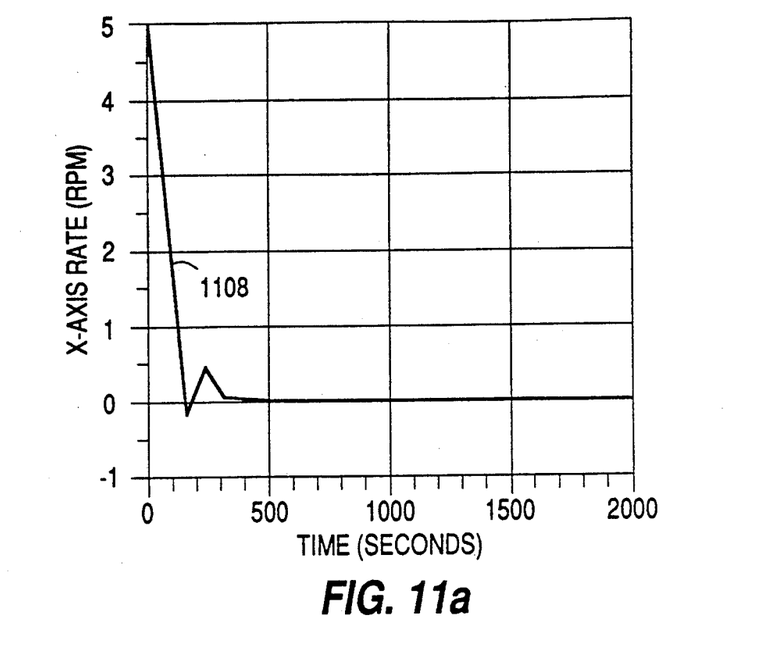
FIGS. 11a, 11b, 11c, and 11d, referred to jointly as FIG. 11, illustrate spin rate, quaternion value, Euler angles, and wheel speed, respectively, versus time, for a simulated maneuver according to the invention under a second set of conditions.
Figure 11B:
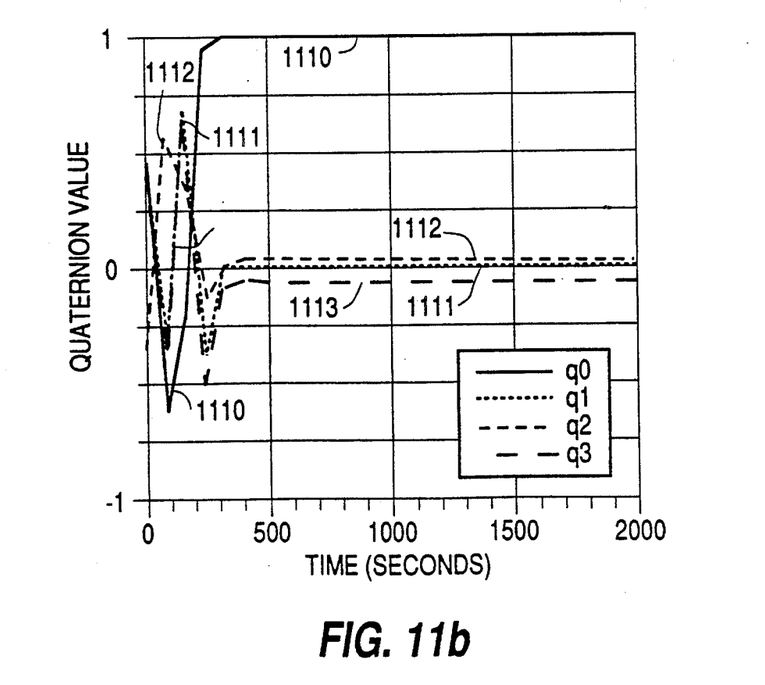
Figure 11C:
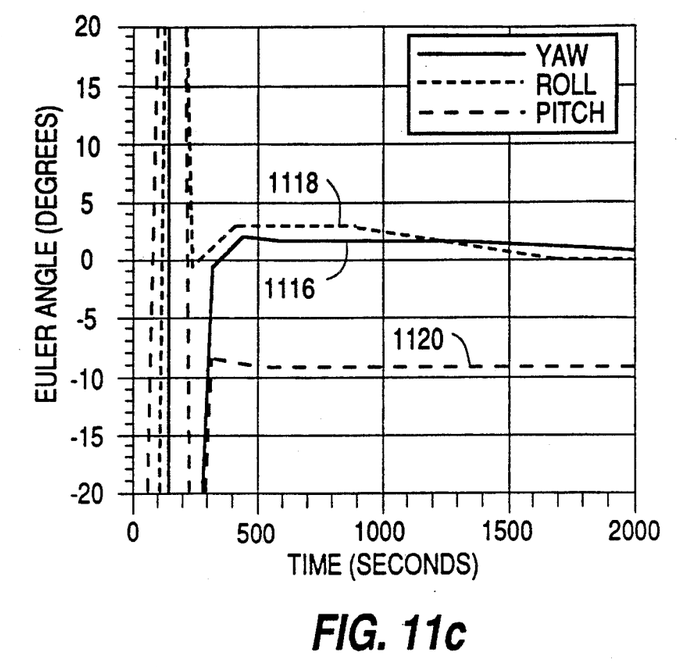
Figure 11D:
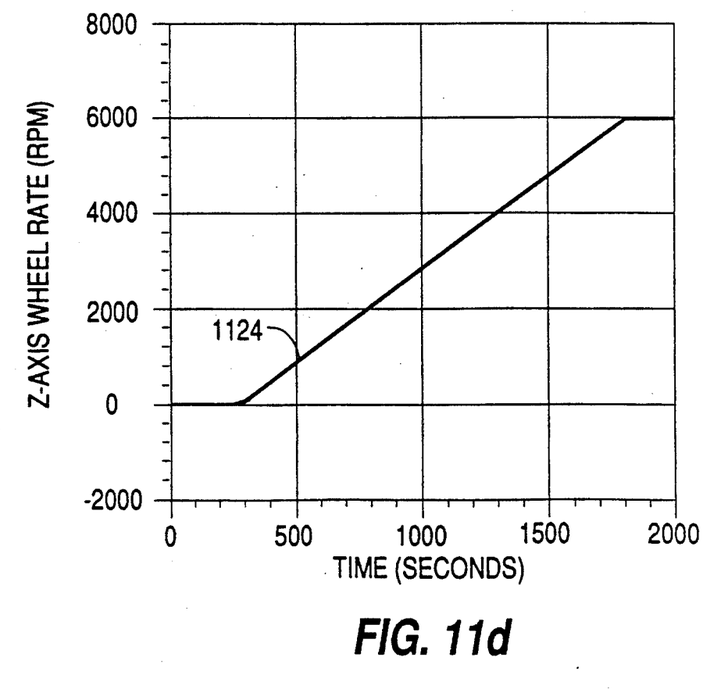

The simulation of FIG. 1 was made with quaternion gains $k_1$, $k_2$ and $k_3$ each having a value of 40. In FIG. 10a, the X axis angular rate, which is initially 5 rpm, is reduced below the threshold of 1.7° per second in 100 seconds, as illustrated by plot 1008. The four quaternion values are illustrated in FIG. 10b. Solid-line plot 1010 represents the value of quaternion q0, dotted line plot 1011 represents q1, and dashed line plots 1012 and 1013 represent q2 and q3, respectively. In FIG. 10c, the plots of yaw (1016), roll (1018) and pitch (1020) Euler angles define the relative orientation between the target frame and the body frame. Plot 1024 of FIG. 10b shows that the wheel spin up begins at about 250 seconds, at a time after the Euler angles have stabilized near their desired values. Wheel spin-up is completed at 1800 seconds.

FIG. 11 represents the results of the simulation of a maneuver in accordance with the invention.

Figure 13:
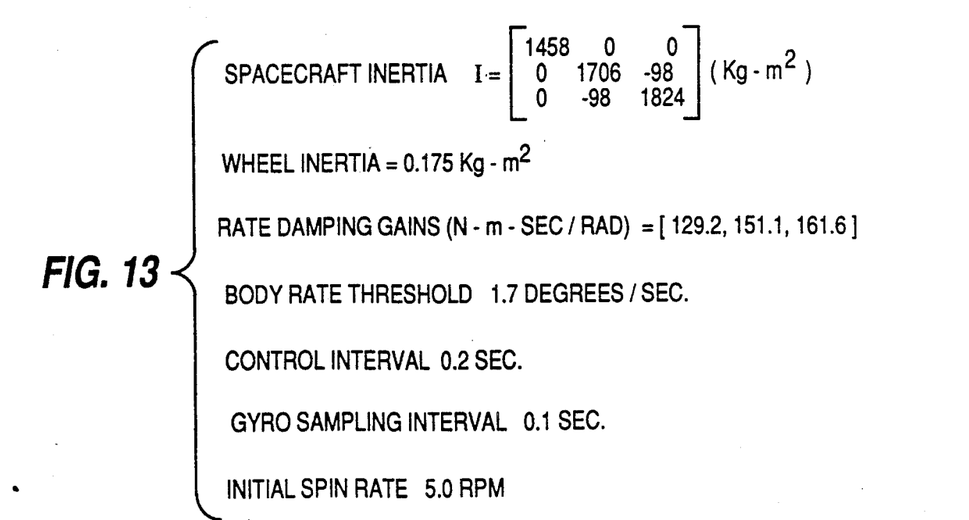
FIG. 13 tabulates the conditions common to the simulations of FIGS. 10 and 11.

The simulation of FIG. 11 was made with quaternion gains $k_1$, $k_2$ and $k_3$ having values of 31.9, 37.4, and 40.0, which are values scaled from the top left to bottom right diagonal of the spacecraft inertia matrix of FIG. 13. In FIG. 11a, the X axis angular rate, which is initially 5 rpm, is illustrated by plot 1008. The four quaternion values are illustrated in FIG. 11b. Solid-line plot 1110 represents the value of quaternion q0, dotted line plot 1111 represents q1, and dashed line plots 1112 and 1113 represent q2 and q3, respectively. In FIG. 11c, the plots of yaw (1116), roll (1118) and pitch (1120) Euler angles define the relative orientation between the target frame and the body frame. Plot 1124 of FIG. 11b shows that the wheel spin up begins at about 250 seconds, at a time after the Euler angles have stabilized near their desired values. Wheel spin-up is completed at 1800 seconds.

Figure 12:
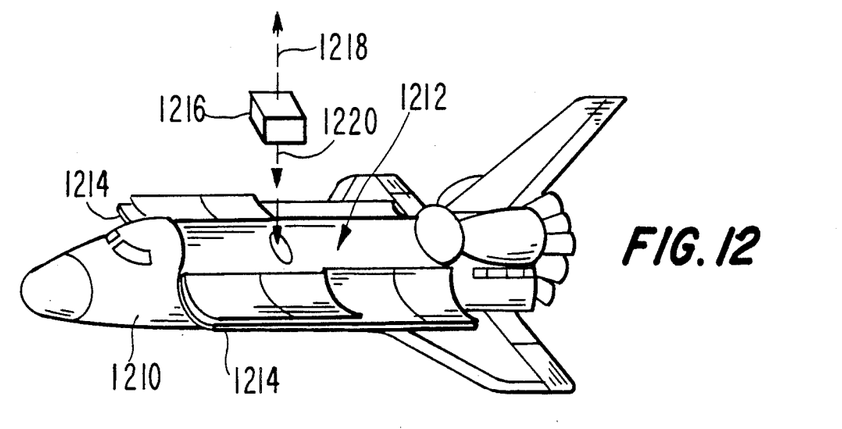
FIG. 12 illustrates a spacecraft being loaded onto or unloaded from an Earth-to-space transport shuttle.

FIG. 12 illustrates a space shuttle 210, illustrating a bay 1212 exposed by opening doors 1214. A spacecraft may be loaded into the bay in the direction of arrow 1220, and unloaded in direction of arrow 1218. The loaded space shuttle is launched into a low Earth orbit as described in conjunction with FIG. 2, and the spacecraft is unloaded at point 29.

Other embodiments of the invention will be apparent to those skilled in the art. For example, the determination of the spin axis attitude may be performed autonomously by the spacecraft, based upon the combination of signals from Earth chord width and sun sensors, or other sensors such as star sensors, together with stored ephemeris information. The desired method may be used for maneuvers of a spacecraft orbiting any heavenly body, and any reference body other than the sun may be used as a reference, even though the terms "Earth" and "sun" have been used to clarify the explanation. While the last step of the method according to the invention, as so far described, has been to accelerate or rotate a momentum wheel or a reaction wheel, it is also possible to spin a principal portion of the body of the spacecraft, leaving only a despun portion in a desired attitude.

What is claimed is:

1. A method for acquiring a 3-axis Earth pointing attitude for an initially spinning spacecraft, which spacecraft includes means for providing three-axis spacecraft angular rate information and sun sensing means, and torquing means, comprising the steps of:

generating 3-axis angular rate information from said means for providing three-axis angular rate information;

determining the attitude of the spin axis of said spinning spacecraft relative to the sun to produce axis orientation information;

generating a sun pulse from said sun sensing means at an instant during the spin cycle of said spinning spacecraft to produce additional orientation information which, together with said axis orientation information, completely determines the 3-axis attitude of said spacecraft;

beginning at the time of said sun pulse, calculating the 3-axis instantaneous attitude of said spacecraft by updating said attitude of said spin axis and said additional orientation information with said angular rate information.

2. A method according to claim 1 including the further step of closing a feedback loop including a torquing means and fed with said instantaneous attitude and rate for tending to reduce said spin and for orienting said spacecraft in a particular attitude relative to the Earth.

3. A method according to claim 2 including the further step of, after said closing step, rotating an angular momentum storage body while maintaining said feedback loop closed to maintain said particular attitude about at least one axis.

4. A method according to claim 1 wherein said step of generating 3-axis angular rate information includes the step of reading signals from gyroscopes.

5. A method according to claim 1 wherein said step of determining the attitude includes the step of operating an Earth sensor.

6. A method according to claim 1 wherein said step of generating a sun pulse includes the step of applying signal from a sun sensor to threshold means.

7. A method for acquiring a 3-axis Earth pointing attitude for an initially spinning spacecraft, which spacecraft includes sun sensing means, torquing means, and means for providing three-axis angular rate information, comprising the steps of:

generating a 3-axis angular rate information from said means for providing three-axis angular rate information;

determining the attitude of the spin axis of said spinning spacecraft relative to the sun to produce axis orientation information;

generating a sun pulse from said sun sensing means at an instant during the spin cycle of said spinning spacecraft to produce additional orientation information which, together with said axis orientation information, completely determines the 3-axis attitude of said spacecraft;

beginning at the time of said sun pulse, calculating the instantaneous attitude of said spacecraft by propagating quaternions to update said axis and additional orientation information with said angular rate information.

8. A method according to claim 2 wherein said closing step includes the step of operating thrusters.

9. A method according to claim 8 wherein said step of operating thrusters includes the step of pulse modulation.

10. A method according to claim 3 wherein said rotating step includes the step of rotating said momentum storage body to store a bias momentum.

11. A method for acquiring a 3-axis Earth pointing attitude for an initially spinning spacecraft, which spacecraft includes sun sensing means, torquing means, and means for providing three-axis angular rate information, comprising the steps of:

generating a 3-axis angular rate information from said means for providing three-axis angular rate information;

determining the attitude of the spin axis of said spinning spacecraft relative to the sun to produce axis orientation information;

generating a sun pulse from said sun sensing means at an instant during the spin cycle of said spinning spacecraft to produce additional orientation information which, together with said axis orientation information, completely determines the 3-axis attitude of said spacecraft;

beginning at the time of said sun pulse, calculating the instantaneous attitude of said spacecraft by updating said axis and additional orientation information with said angular rate information;

closing a feedback loop including a torquing means and fed with said instantaneous attitude and rate for tending to reduce said spin and for orienting said spacecraft in a particular attitude relative to the Earth;

after said closing step, rotating an angular momentum storage body while maintaining said feedback loop closed to maintain said particular attitude about at least one axis; and further comprising the step of opening said feedback loop after said momentum storage body has reached an operating speed.

12. A method according to claim 3 wherein said rotating step comprises the step of rotating a wheel.

13. A method according to claim 12 wherein said rotating step comprises rotating said wheel about an axis aligned with orbit normal.

14. A method for launching a spacecraft into a predetermined orbit in a 3-axis stabilized attitude, comprising the steps of:

loading a spacecraft into an Earth-to-space shuttle, said spacecraft including sun sensing means, torquing means, and 3-axis spacecraft angular rate determining means;

transporting said shuttle into a low Earth orbit;

unloading said spacecraft from said shuttle and spin-stabilizing said spacecraft;

applying thrust to said spacecraft for moving said spacecraft from said low Earth orbit to an elliptical transition orbit including an apogee near the attitude of said predetermined orbit;

determining the orientation of the spin axis of said spin-stabilized spacecraft;

producing a sun pulse from said sun sensing means at a particular instant during the spin cycle of said spacecraft, to thereby identify a particular known attitude;

continuously updating said known attitude by the use of said 3-axis angular rate information to produced a stream of attitude information; and closing a feedback loop including said torquing means for reducing said spin and for causing said spacecraft to adopt a predetermined attitude.

15. A method according to claim 14, including the further step of:

accelerating a momentum storage means for 3-axis stabilizing said spacecraft with the axis of said momentum storage means aligned with orbit normal.

16. A method for launching a spacecraft into a predetermined orbit in a 3-axis stabilized attitude, comprising the steps of:

loading a spacecraft onto an unmanned vehicle, said spacecraft including sun sensing means, Earth sensing means, torquing means, and 3-axis spacecraft angular rate determining means;

operating said vehicle to cause it to assume an elliptical orbit including an apogee near the altitude of said predetermined orbit;

releasing said spacecraft from said vehicle and spin-stabilizing said spacecraft;

determining the orientation of the spin axis of said spin-stabilized spacecraft;

producing a sun pulse from said sun sensing means at a particular instant during the spin cycle of said spacecraft, to thereby indicate a particular known attitude;

continuously updating said known attitude by use of said 3-axis spacecraft angular rate to produce a stream of attitude information; and closing a feedback loop including said torquing means for reducing said spin and for causing said spacecraft to adopt a predetermined attitude.

17. A method according to claim 16, including the further step of:

accelerating angular momentum storage means for 3-axis stabilizing said spacecraft with said axis of said momentum wheel aligned with orbit normal.

* * * * *

UNITED STATES PATENT AND TRADEMARK OFFICE
CERTIFICATE OF CORRECTION

PATENT NO. : 5,020,744

DATED : June 4, 1991

INVENTOR(S) : Marc Schwarzschild

It is certified that error appears in the above-identified patent and that said Letters Patent is hereby corrected as shown below:

Column 7, line 59, "$\Omega_1$," should be --$\omega_1$,--.

Column 7, line 60, "$\Omega_2$ and $\Omega_3$" should be --$\omega_2$ and $\omega_3$--.

Column 9, line 35, "3-axis instantaneous" should be --instantaneous 3-axis--

Signed and Sealed this

Twenty-ninth Day of September, 1992

Attest:

DOUGLAS B. COMER

*Attesting Officer*   *Acting Commissioner of Patents and Trademarks*